Patented June 10, 1930

1,763,428

UNITED STATES PATENT OFFICE

WALTER HAMIS GLOVER, OF LEAMINGTON, AND CLAUDE DIAMOND, OF COVENTRY, ENGLAND, ASSIGNORS TO COURTAULDS, LIMITED, OF LONDON, ENGLAND

MANUFACTURE OF CELLULOSE DERIVATIVES

No Drawing. Application filed February 3, 1927, Serial No. 165,752, and in Great Britain April 10, 1926.

Cellulose acetate, for the purpose of making filaments films and the like, has hitherto been produced on a commercial scale from cotton. It has been stated that bleached wood pulp can be acetylated, but hitherto no product entirely satisfactory for the manufacture of filaments and the like appears to have been obtained. The reason for this may lie in the fact that bleached wood pulp is less homogeneous than cotton; consequently, when treated with acetylating agents in the usual manner, parts of the wood pulp are not acetylated, or not sufficiently acetylated, and solutions of the resulting product are unsatisfactory as regards clarity and homogeneity. If, on the other hand, the action of the acetylating agent be intensified, the wood pulp may be sufficiently attacked to yield a clear solution in the various solvents, but the viscosity of the solutions thus obtained is very low, showing considerable degradation of the cellulose, such degredation rendering the cellulose compound unsuitable for the production of filaments. It has also been proposed to convert sulphite cellulose into alkyl derivatives which are soluble in alkali solutions, and then to esterify these alkali-soluble cellulose derivatives containing alkyl groups.

We have now discovered the cellulose derivatives, very suitable for the production of filaments, films and the like, can be produced by acting on alkali cellulose with such a restricted quantity of diethyl sulphate at temperatures not substantially exceeding the normal temperature, that a homogeneously ethylated cellulose is obtained which is insoluble in water and in dilute alkali, and in the common organic solvents, and which contains not more than one $C_2H_5$ group for every $C_6H_{10}O_5$ present and not substantially less than 4 per cent of ethyl, then removing the free alkali and drying the product obtained, and finally treating the dried product with an acetylating agent containing acetic anhydride.

Under the term "drying the product", both in the specification and claims, we include the removal of all or of the greater part of the moisture, so that the product does not contain more than about 6 per cent of water, which is the quantity which is normally left in the product after prolonged exposure to the atmosphere. We generally prefer, however, to drive off more moisture from the ethyl cellulose before acetylating the same, so that it contains say from 2 to 4 per cent of moisture or even less, since acetylation takes place more readily in the presence of such smaller quantities of moisture, and less acetic anhydride is required for acetylation.

The invention can be carried out by steeping wood pulp in from 15 to 21 per cent caustic soda solution, pressing to, say, 2.8 to 3.1 times the weight of the cellulose then milling the alkali cellulose in a manner similar to that which is employed in the comminution of alkali cellulose for the production of viscose, then adding a relatively small amount of diethyl sulphate and continuing the milling for from 30 minutes to one hour while maintaining the temperature at 18° to 20° centigrade. The mass is then left for from 2 to 5 days at from 17° to 20° centigrade, preferably in an atmosphere of nitrogen, but this is by no means essential, after which the mass is washed with water until free from alkali, and dried until it contains not more than about 3 per cent of water. A suitable quantity of diethyl sulphate to be employed for producing ethylated cellulose containing about 5 per cent of $C_2H_5$ may be, for instance, from 40 to 75 parts for every 100 parts of cellulose. For higher ethylation, more diethyl sulphate should be employed. The product is a homogeneously ethylated cellulose, the ethyl content of which can easily be regulated between about 4 per cent and 15.5 per cent of ethyl $(C_2H_5)$ by varying the strength of the caustic soda solution, the proportion of diethyl sulphate employed and the duration of the ethylation.

As aforesaid, the ethylated celluloses which are prepared as intermediate products according to this invention are insoluble in caustic soda solution. Those containing from 4 to 7 per cent of ethyl swell considerably in a 10 per cent solution of caustic soda but do not dissolve while the comparatively more highly ethylated celluloses containing from 7 to 15.5 per cent of ethyl are resistant to dilute alkali. None of them can be acetylated by the action of acetic acid alone.

A suitable method of acetylating the ethylated celluloses prepared as hereinbefore described and dried until they do not contain more than 3 per cent of water, consists in introducing 100 parts of the dry ethylated cellulose into a mixture of 200 to 225 parts of acetic anhydride, 400 to 600 parts of acetic acid and from 2 to 5 parts of sulphuric acid at a temperature commencing below 10° centigrade and finally not exceeding about 25° centigrade the acetylation requiring say from 5 to 15 hours. The product is then hydrolyzed in the usual manner. It will be noted that the process according to this invention is also advantageous in that only from 200 to 225 parts of acetic anhydride are required for acetylation, whereas when acetylating ordinary cellulose about 400 parts of acetic anhydride are required for every 100 parts of the cellulose.

The acetylated ethyl cellulose obtained according to this invention is eminently suitable for the production of filaments and films since it yields a clear solution in acetone and the solution obtained has a high viscosity, such as is desirable in solutions of cellulose compounds which are to be converted into filaments by the dry spinning process.

The alkali cellulose, after being prepared, should preferably not be allowed to stand for such long time or at such high temperatures that material oxidation could take place.

The following are examples serving further to explain the nature of this invention but the invention is not restricted to these examples. All the parts are by weight.

*Example 1*

100 parts of sulphite wood pulp are steeped in an excess of a 21 per cent solution of caustic soda, pressed to about 300 parts and transferred to a grinding machine and milled for about 2 hours at 15° to 20° centigrade. 290 parts of diethyl sulphate are then added and the milling continued for a further period of 30 minutes to one hour at 15° to 20° centigrade, after which the mass is transferred to a suitable vessel and maintained at 15° to 20° centigrade for 3 to 5 days preferably in an atmosphere of nitrogen. The mass is then washed free from alkali and dried until the moisture content is not more than 3 per cent. This intermediate product is an ethyl cellulose containing about 15 per cent of ethyl ($C_2H_5$). Each 100 parts of this product is introduced into a mixture of 2 parts of sulphuric acid, 200 parts of acetic anhydride and 500 parts of acetic acid and the whole stirred continuously, the temperature being maintained at a low degree by cooling with ice, for instance, not above 10° centigrade. The temperature is subsequently allowed to rise to 15° centigrade and maintained at this temperature until acetylation is complete, which should occupy from 10 to 15 hours. The period may be shortened by raising the temperature to 20° centigrade during the latter part of the acetylation. The acetate may be precipitated at once or hydrolyzed in the usual manner until the desired solubility has been obtained.

*Example 2*

100 parts of bleached sulphite wood pulp is steeped in an excess of a 17.5 per cent solution of caustic soda for about 2 hours at the ordinary temperature, pressed to three times the original weight of the pulp and milled at 15° to 20° centigrade for 2 hours when 220 parts of diethyl sulphate are added and the milling continued for a further 30 minutes to one hour. The mass, after being kept preferably in an inert atmosphere for 3 to 5 days at 15° to 20° centigrade, is washed thoroughly and dried until it contains not more than 3 per cent of moisture. This intermediate product is an ethyl ether of cellulose containing approximately 13.5 per cent of ethyl ($C_2H_5$). This ether is acetylated as described in the previous example using 200 parts of acetic anhydride for 100 parts of ether giving a clear solution free from undissolved fibres which may be subjected to hydrolysis or at once precipitated.

*Example 3*

100 parts of bleached sulphite wood pulp are steeped in an excess of 17.5 per cent solution of caustic soda, pressed to from 2.5 to 3 times the original weight of the cellulose and disintegrated for about 2 hours at 15° to 20° centigrade. From 50 to 60 parts of diethyl sulphate are then added and the whole mixed for one hour. The mass is then kept for 2 to 4 days at 15° to 20° centigrade, preferably in an inert atmosphere. The mass is then washed with water until free from salt and alkali, and then dried until it contains only about 3 per cent of moisture. This intermediate product is an ethyl ether of cellulose containing approximately 5 per cent of ethyl ($C_2H_5$). The said product is introduced into a mixture of 2.5 parts of sulphuric acid, 225 parts of acetic anhydride and 500 parts of acetic acid for each 100 parts of ether. Acetylation proceeds smoothly at a temperature of 18° to 20° centigrade and is complete in 16 to 20 hours giving a viscous solution from which the acetate may be precipitated at once by the addition of water or the solubility of the product may be modified by hydrolysis before being precipitated.

Although the process of this invention is particularly applicable to cellulose in the form of wood pulp, we wish it to be understood that our invention is not restricted to the use of wood pulp, but includes the use of other forms of cellulose, particularly cotton and cotton linters.

What we claim is:—

1. The production of cellulose derivatives by acting on alkali cellulose with sufficient quantity of di-ethyl sulphate at temperatures between zero and 25° centigrade to produce an ethyl cellulose which is insoluble in water and in dilute alkali and in the common organic solvents, and which contains not more than one ethyl group for every $C_6H_{10}O_5$ present and not less than 4 per cent of ethyl, then removing the free alkali and drying the product obtained, and finally treating the dried product with an acetylating agent containing acetic anhydride.

2. The production of cellulose derivatives by treating with an acetylating agent containing acetic anhydride, an ethyl cellulose which is insoluble in water and in dilute alkali and in the common organic solvents, and which contains not more than one ethyl group for every $C_6H_{10}O_5$ present and not less than 4 per cent of ethyl.

In testimony whereof we have signed our names to this specification.

WALTER HAMIS GLOVER.
CLAUDE DIAMOND.